United States Patent
Yang et al.

(10) Patent No.: US 10,425,825 B2
(45) Date of Patent: Sep. 24, 2019

(54) METHOD AND APPARATUS FOR TRANSMITTING SIGNAL IN WIRELESS COMMUNICATION SYSTEM

(71) Applicant: LG ELECTRONICS INC., Seoul (KR)

(72) Inventors: Suckchel Yang, Seoul (KR); Hanbyul Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 15/504,638

(22) PCT Filed: Aug. 20, 2015

(86) PCT No.: PCT/KR2015/008708
§ 371 (c)(1),
(2) Date: Feb. 16, 2017

(87) PCT Pub. No.: WO2016/028103
PCT Pub. Date: Feb. 25, 2016

(65) Prior Publication Data
US 2017/0238190 A1 Aug. 17, 2017

Related U.S. Application Data

(60) Provisional application No. 62/039,873, filed on Aug. 20, 2014, provisional application No. 62/075,267, (Continued)

(51) Int. Cl.
*H04W 16/14* (2009.01)
*H04L 5/00* (2006.01)
(Continued)

(52) U.S. Cl.
CPC ............ *H04W 16/14* (2013.01); *H04L 5/00* (2013.01); *H04L 5/0048* (2013.01); *H04L 27/0006* (2013.01); *H04W 72/0446* (2013.01)

(58) Field of Classification Search
CPC ................ H04W 16/14; H04L 5/00
See application file for complete search history.

(56) References Cited

U.S. PATENT DOCUMENTS

2009/0238241 A1\* 9/2009 Hooli ............... H04B 1/7143
375/133
2009/0274076 A1\* 11/2009 Muharemovic ....... H04L 5/0039
370/280
(Continued)

FOREIGN PATENT DOCUMENTS

WO 2013179095 12/2013

OTHER PUBLICATIONS

PCT International Application No. PCT/KR2015/008708, Written Opinion of the International Searching Authority dated Dec. 8, 2015, 19 pages.

*Primary Examiner* — Gregory B Sefcheck
*Assistant Examiner* — Jael M Ulysse
(74) *Attorney, Agent, or Firm* — Lee, Hong, Degerman, Kang & Waimey

(57) ABSTRACT

The present invention relates to a wireless communication system and, particularly, to a method and an apparatus therefor, said method comprising the steps of: configuring a plurality of cells including a licensed band cell and an unlicensed band cell; receiving SRS configuration information for the unlicensed band cell, wherein the SRS configuration information comprises subframe period and offset information for SRS transmission; and performing a procedure for transmitting SRS from a first subframe periodically configured on the unlicensed band cell on the basis of the SRS configuration information, wherein if the first subframe
(Continued)

belongs to a UE-reserved time duration on the unlicensed band cell, then the SRS is transmitted in the first subframe, and wherein if the first subframe does not belong to the UE-reserved time duration on the unlicensed band cell, then the transmission of the SRS is skipped in the first subframe.

8 Claims, 11 Drawing Sheets

Related U.S. Application Data filed on Nov. 5, 2014, provisional application No. 62/082,058, filed on Nov. 19, 2014, provisional application No. 62/094,055, filed on Dec. 18, 2014.

(51) Int. Cl.
*H04W 72/04* (2009.01)
*H04L 27/00* (2006.01)

(56) References Cited

U.S. PATENT DOCUMENTS

| | | | | |
|---|---|---|---|---|
| 2009/0323664 A1* | 12/2009 | Li | H04L 5/0051 | 370/344 |
| 2011/0268028 A1* | 11/2011 | Stern-Berkowitz | H04L 5/0048 | 370/328 |
| 2011/0268087 A1* | 11/2011 | Kwon | H04L 5/0005 | 370/331 |
| 2011/0294529 A1* | 12/2011 | Luo | H04L 5/0035 | 455/509 |
| 2012/0099467 A1* | 4/2012 | Yamazaki | H04W 72/08 | 370/252 |
| 2012/0120826 A1* | 5/2012 | Hao | H04L 5/0023 | 370/252 |
| 2012/0224556 A1* | 9/2012 | Yoon | H04B 7/024 | 370/329 |
| 2012/0281566 A1* | 11/2012 | Pelletier | H04W 76/27 | 370/252 |
| 2012/0281680 A1* | 11/2012 | Bostrom | H04L 5/0051 | 370/336 |
| 2012/0307869 A1* | 12/2012 | Charbit | H04B 1/715 | 375/132 |
| 2013/0028219 A1* | 1/2013 | Lee | H04L 5/0053 | 370/329 |
| 2013/0044713 A1* | 2/2013 | Suh | H04L 5/0048 | 370/329 |
| 2013/0083683 A1* | 4/2013 | Hwang | H04W 64/00 | 370/252 |
| 2013/0114505 A1* | 5/2013 | Haim | H04W 52/146 | 370/328 |
| 2013/0156014 A1* | 6/2013 | Kim | H04L 5/0051 | 370/336 |
| 2013/0170466 A1* | 7/2013 | Nishio | H04L 5/0007 | 370/329 |
| 2013/0201884 A1* | 8/2013 | Freda | H04W 72/005 | 370/278 |
| 2013/0223394 A1* | 8/2013 | Nishio | H04L 5/0048 | 370/329 |
| 2013/0250925 A1* | 9/2013 | Lohr | H04W 72/0446 | 370/336 |
| 2013/0272229 A1* | 10/2013 | Dinan | H04W 52/18 | 370/329 |
| 2013/0272231 A1* | 10/2013 | Dinan | H04W 52/34 | 370/329 |
| 2013/0279433 A1* | 10/2013 | Dinan | H04W 52/146 | 370/329 |
| 2013/0315114 A1 | 11/2013 | Seo et al. | | |
| 2013/0329660 A1* | 12/2013 | Noh | H04L 5/0035 | 370/329 |
| 2014/0010182 A1* | 1/2014 | Chunli | H04L 5/0048 | 370/329 |
| 2014/0016620 A1* | 1/2014 | Singh | H04W 56/0005 | 370/336 |
| 2014/0071931 A1 | 3/2014 | Lee et al. | | |
| 2014/0112277 A1 | 4/2014 | Yang et al. | | |
| 2014/0146770 A1 | 5/2014 | Iwai et al. | | |
| 2014/0199992 A1* | 7/2014 | Chincholi | H04W 16/14 | 455/422.1 |
| 2015/0049712 A1* | 2/2015 | Chen | H04W 72/1215 | 370/329 |

* cited by examiner

METHOD AND APPARATUS FOR TRANSMITTING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2015/008708, filed on Aug. 20, 2015, which claims the benefit of U.S. Provisional Application No. 62/039,873, filed on Aug. 20, 2014, 62/075,267, filed on Nov. 5, 2014, 62/082,058, filed on Nov. 19, 2014 and 62/094,055, filed on Dec. 18, 2014, the contents of which are all hereby incorporated by reference herein in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Task

An object of the present invention is to provide a method of efficiently performing signal transmission and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of controlling signal transmission, which is controlled by a user equipment (UE) in a wireless communication system, includes the steps of configuring a plurality of cells including a licensed band cell and an unlicensed band cell, receiving SRS configuration information for the unlicensed band cell, wherein the SRS configuration information includes a subframe period for SRS transmission and offset information, performing a procedure for transmitting an SRS in a first subframe, which is periodically configured in the unlicensed band cell, based on the SRS configuration information. In this case, if the first subframe belongs to a UE-reserved time duration in the unlicensed band cell, the SRS is transmitted in the first subframe. If the first subframe does not belong to the UE-reserved time duration in the unlicensed band cell, transmission of the SRS can be skipped in the first subframe.

To further achieve these and other advantages and in accordance with the purpose of the present invention, according to a different embodiment, a user equipment (UE) configured to control signal transmission in a wireless communication system includes an RF (radio frequency) module and a processor, the processor configured to set a plurality of cells including a licensed band cell and an unlicensed band cell, the processor configured to receive SRS configuration information for the unlicensed band cell, wherein the SRS configuration information includes a subframe period for SRS transmission and offset information, the processor configured to perform a procedure for transmitting an SRS in a first subframe, which is periodically configured in the unlicensed band cell, based on the SRS configuration information. In this case, if the first subframe belongs to a UE-reserved time duration in the unlicensed band cell, the SRS is transmitted in the first subframe. If the first subframe does not belong to the UE-reserved time duration in the unlicensed band cell, transmission of the SRS can be skipped in the first subframe.

Preferably, the UE-reserved time duration can include a set of subframes reserved for uplink transmission in the unlicensed band cell based on carrier sensing of the UE.

Preferably, if the first subframe does not belong to the UE-reserved time duration in the unlicensed band cell, the procedure for transmitting the SRS can be performed in a second subframe belonging to a closest UE-reserved time duration appearing after the first subframe.

Preferably, if an interval between the first subframe and the second subframe is less than a threshold, the SRS is transmitted in the second subframe and if the interval between the first subframe and the second subframe is equal to or greater than the threshold, transmission of the SRS can be dropped.

Preferably, if the SRS is transmitted in the first subframe, a channel reservation signal having a frequency band identical to the SRS can be transmitted before the SRS is transmitted.

Advantageous Effects

According to the present invention, it is able to efficiently perform signal transmission in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
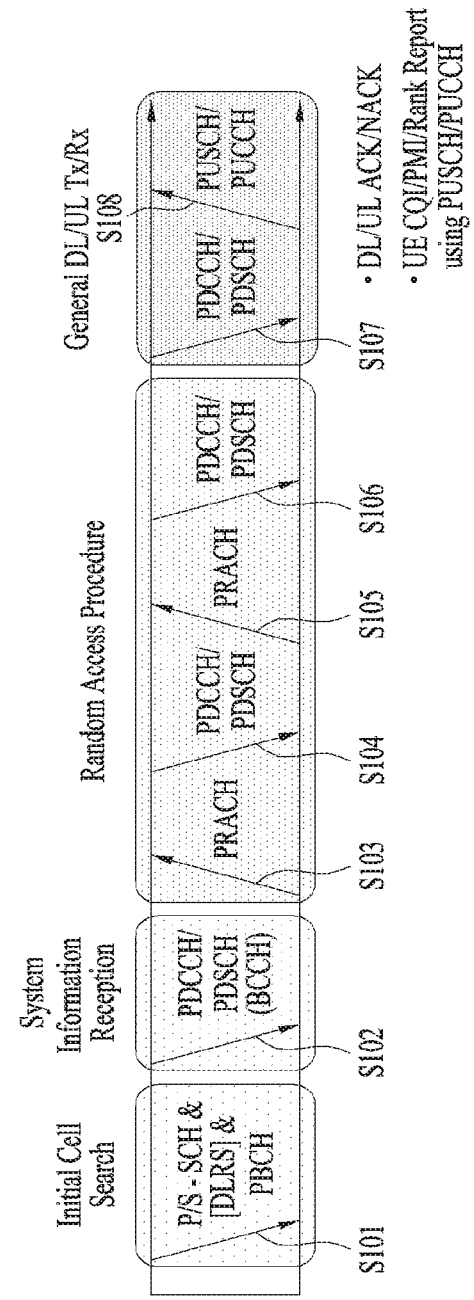
FIG. 1 illustrates physical channels used in 3GPP LTE (-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
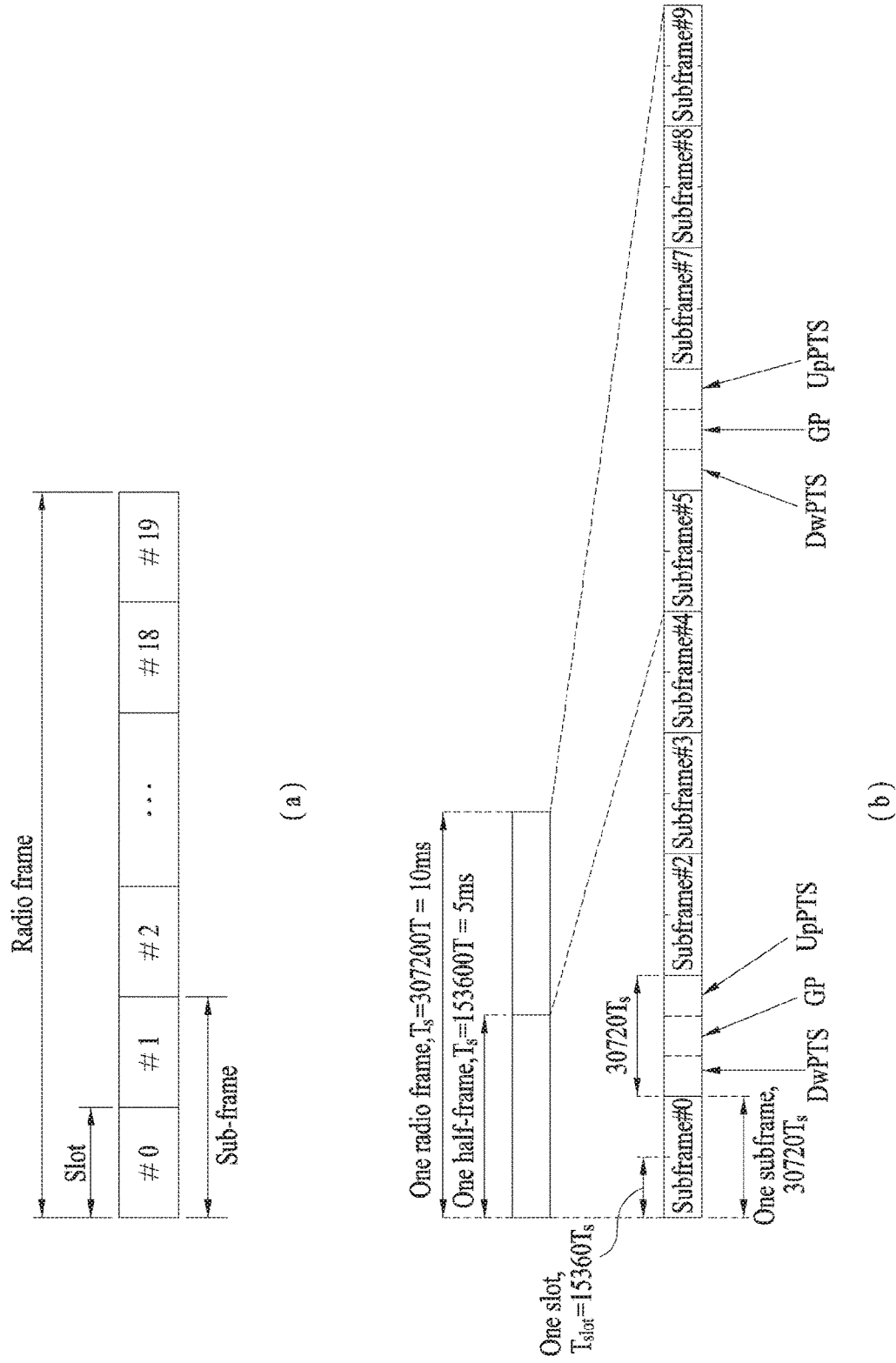
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
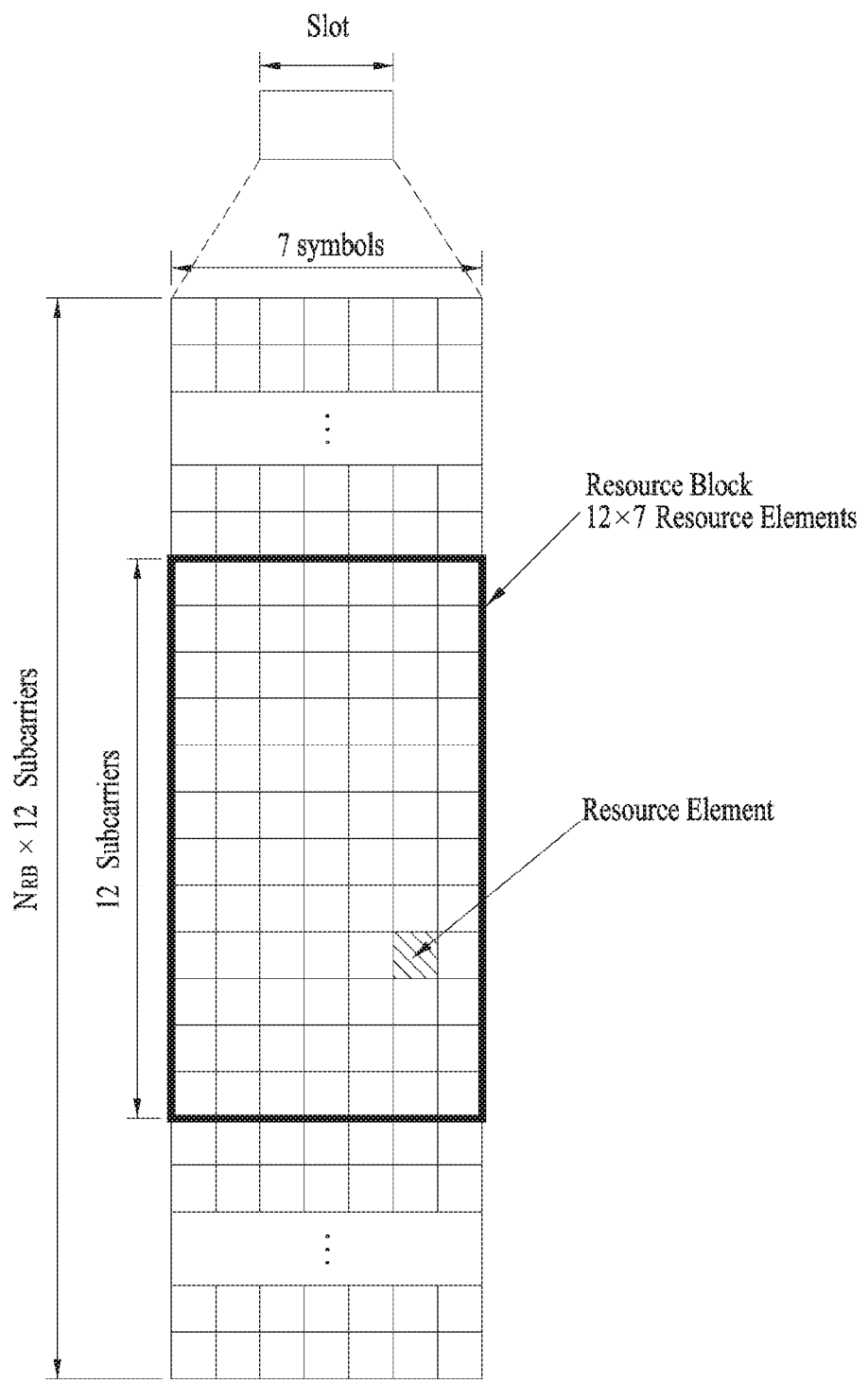
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
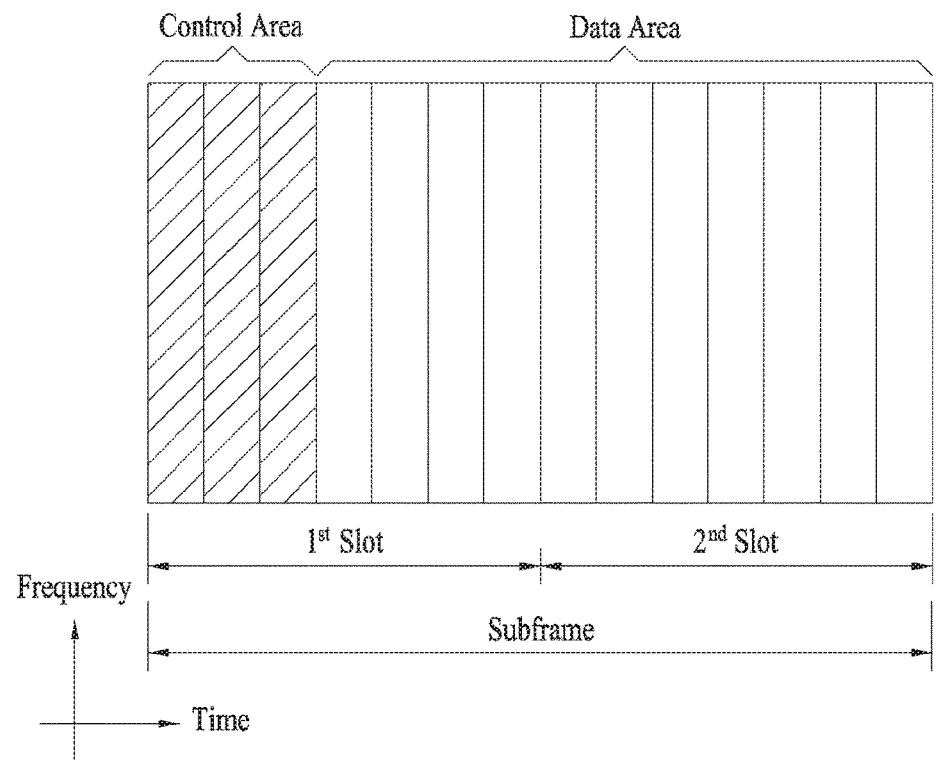
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG, 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
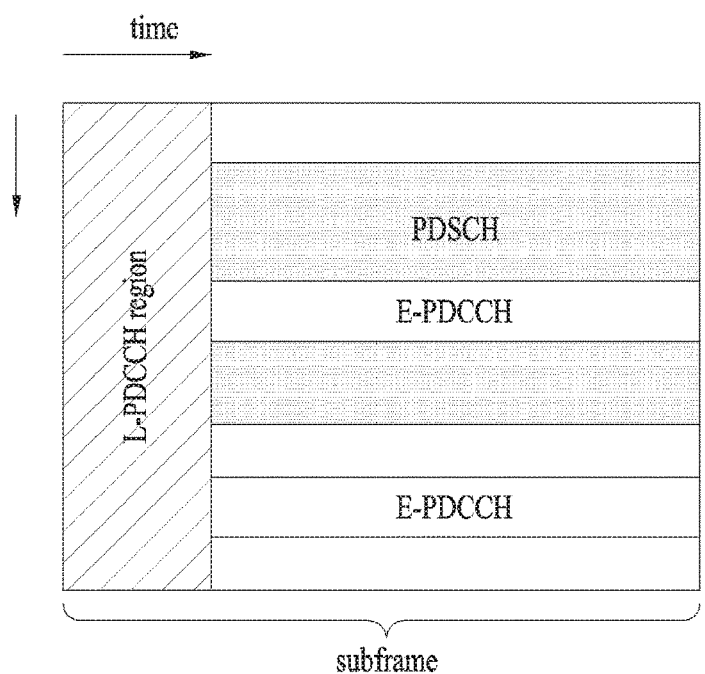
FIG. 5 illustrates an example of Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (ports) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
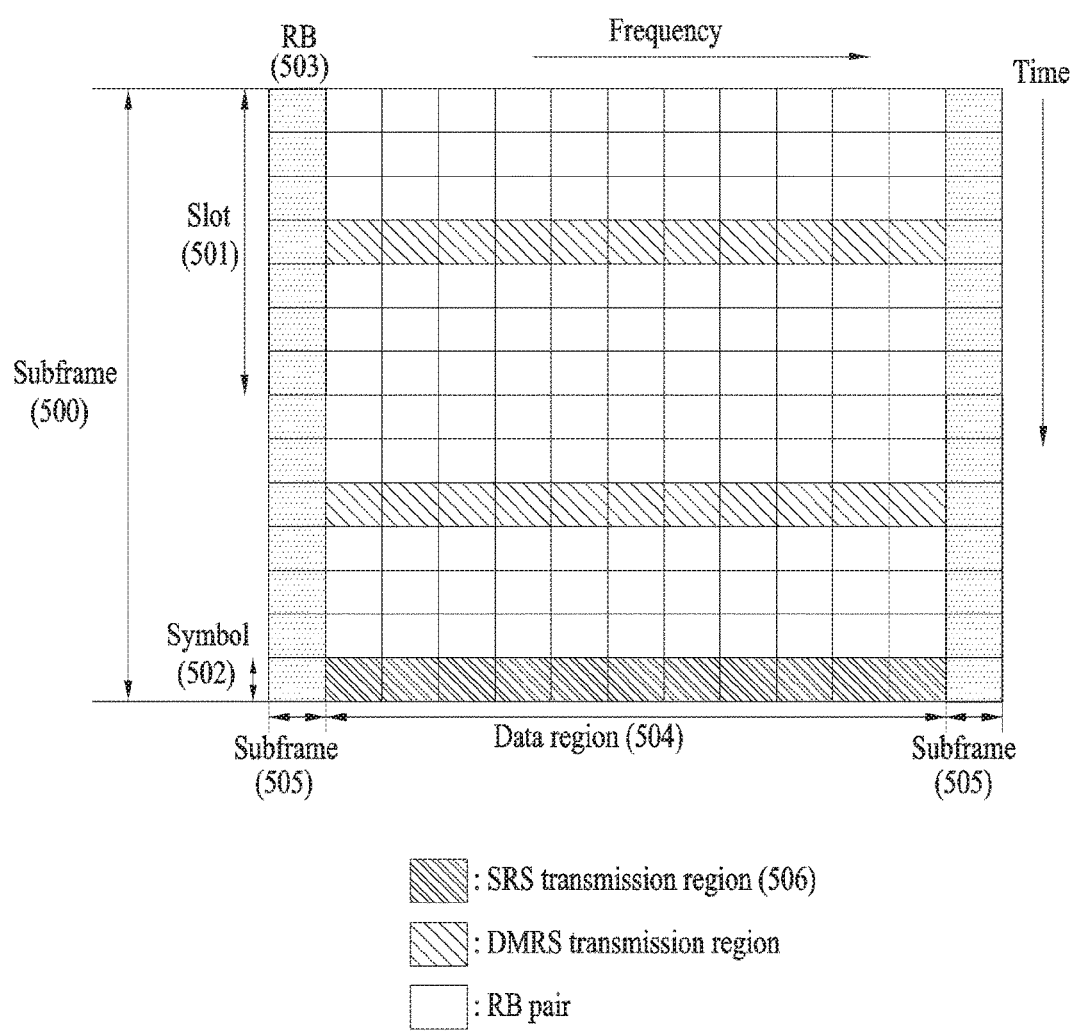
FIG. 6 illustrates the structure of an uplink subframe.

FIG. 6 illustrates an uplink subframe structure

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE (-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH).

A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRSs are periodically or aperiodically transmitted.

A configuration for periodically transmitting an SRS is configured by a cell-specific SRS parameter and a UE-specific SRS parameter. The cell-specific SRS parameter (i.e., cell-specific SRS configuration) and the UE-specific SRS parameter (i.e., UE-specific SRS configuration) are transmitted to a UE via higher layer (e.g., RRC) signaling. The cell-specific SRS parameter informs the UE of a subframe reserved for SRS transmission in a cell and the UE-specific SRS parameter informs the UE of a subframe to be actually used by the UE among subframes reserved for SRS transmission. The UE periodically transmits an SRS via a specific symbol (e.g., last symbol) of the subframe designated by the UE-specific SRS parameter. Specifically, the cell-specific SRS parameter includes srs-BandwidthConfig and srs-SubframeConfig. The srs-BandwidthConfig indicates information on a frequency band capable of transmitting an SRS and the srs-SubframeConfig indicates information (e.g., transmission period/offset) on a subframe capable of transmitting an SRS. A subframe in which an SRS is transmitted in a cell is periodically configured in a frame. The UE-specific SRS parameter includes srs-Bandwidth, srs-HoppingBandwidth, freqDomainPosition, and srs-ConfigIndex. The srs-Bandwidth indicates a value used for a UE to configure a frequency band on which an SRS is transmitted. The srs-HoppingBandwidth indicates a value used for configuring frequency hopping of an SRS. The freqDomainPosition indicates a value used for determining a frequency position on which an SRS is transmitted. The srs-ConfigIndex indicates a value (e.g., transmission period/offset) used for a UE to configure a subframe in which an SRS is transmitted.

A subframe in which an aperiodic SRS is transmitted can be periodically positioned among subframes indicated by the cell-specific parameter. For example, the subframe in which the aperiodic SRS is transmitted can be given by an SRS transmission period/offset ($T_{offset}$). The aperiodic SRS is indicated by UL grant PDCCH. A UE transmits an SRS in a first subframe in which an aperiodic SRS is transmitted appearing after 4 subframes from a subframe in which an aperiodic SRS request is received.

Meanwhile, in order to protect SRS transmission in a subframe/band reserved by the cell-specific SRS parameter, when PUSCH/PUCCH is transmitted in the subframe/band, the UE does not transmit the PUSCH/PUCCH in the last symbol of the subframe irrespective of whether or not an SRS is practically transmitted. To this end, the PUSCH/PUCCH is rate-matched or punctured for a symbol (i.e., last symbol) for transmitting the SRS.

Figure 7:
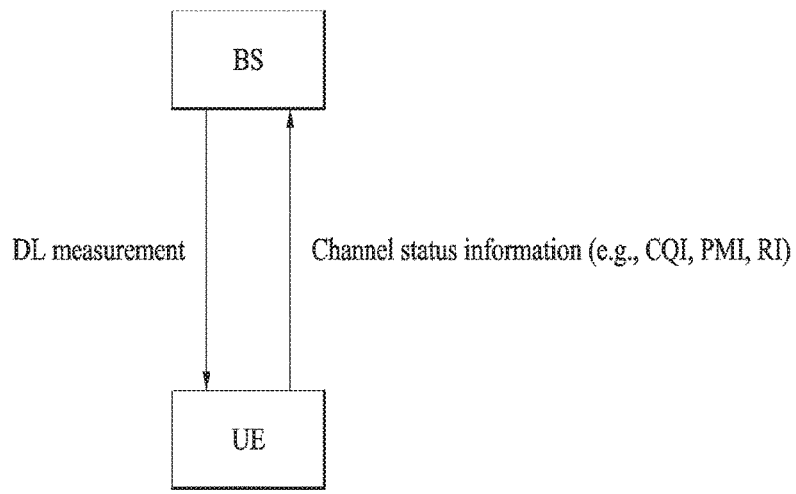
FIG. 7 illustrates an example of a concept for channel status information generation and transmission.

FIG. 7 illustrates an example of a concept for channel status information generation and transmission.

Referring to FIG. 7, a UE measures downlink quality and reports channel state information to an eNB. The eNB performs downlink scheduling (UE selection, resource allocation, etc.) according to the reported channel state information. The channel state information includes at least one selected from the group consisting of CQI, PMI, and RI. The CQI can be generated in various ways. For example, it may be able to quantize channel state (or spectrum efficiency), calculate SINR, or use MCS (modulation and coding scheme) for a state to which a channel is actually applied to generate the CQI.

Downlink quality is measured based on a reference signal (RS) transmitted by an eNB. The RS includes a CRS (cell-specific RS), a CSI-RS (channel state information RS), and a zero-power CSI-RS. The CRS is transmitted over the entire band in every subframe and the CSI-RS is transmitted in a CSI-RS transmission subframe which is periodically configured by a transmission period/offset. The zero-power CSI-RS is used for IM (interference measurement). It may configure CRS configuration information (e.g., number of antenna ports) and CSI-RS configuration information (e.g., transmission period/offset, CSI-RS port number) via higher layer signaling.

Figure 8:
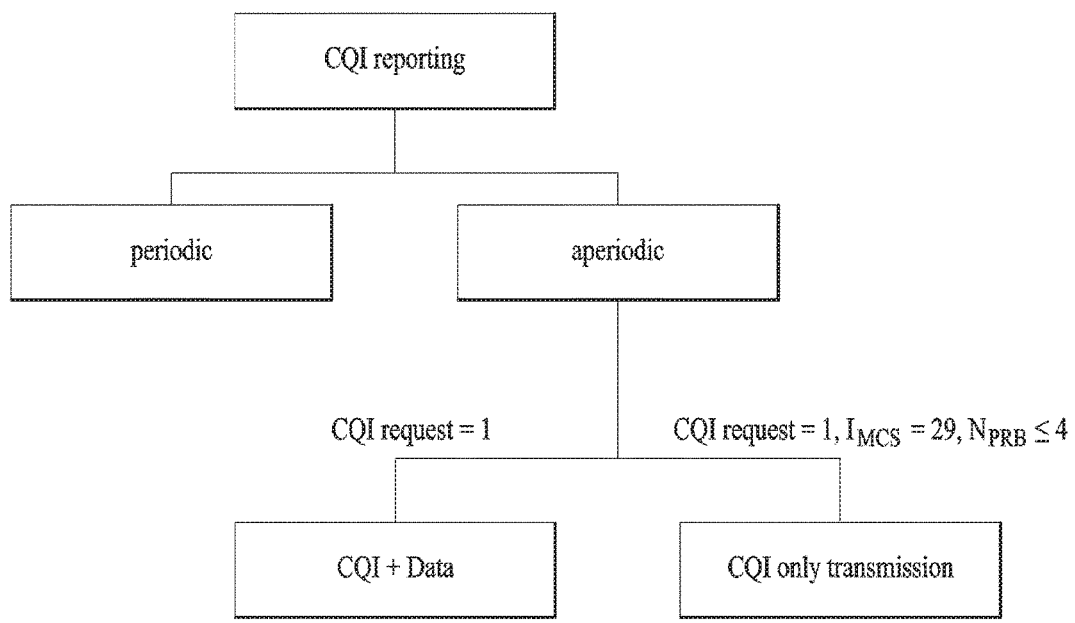
FIG. 8 illustrates an example of a CQI report scheme of LTE according to a related art.

FIG. 8 illustrates an example of a CQI report scheme of LTE according to a related art.

Referring to FIG. 8, CQI report can be classified into a periodic report and an aperiodic report. The periodic CQI report means that a UE reports channel quality at a determined timing without any separate signaling. On the contrary, the aperiodic CQI report means that a network asks a UE to report CQI via explicit signaling according to the necessity of the network. If the aperiodic CQI report is necessary, the network signals an uplink scheduling grant to the UE using a DCI format 0. If a CQI request value of the DCI format 0 corresponds to 1, the UE performs the aperiodic CQI report. The aperiodic CQI report (i.e., CQI request=1) is divided into a CQI only (transmission) mode and a CQI+data (transmission) mode. If the CQI request value corresponds to 1, an MCS index (IMCS) corresponds to 29, and the number of allocated PRBs is equal to or less than 4 (NPRB≤4), the UE comprehends the signaling as the CQI only mode. Otherwise, the UE comprehends the signaling as the CQI+data mode. In case of the CQI only mode, the UE transmits channel state information only via PUSCH without any data (i.e., UL-SCH transport block). On the contrary, in case of the CQI+data mode, the UE transmits channel state information and data together via PUSCH. The CQI only mode can be referred to as a feedback only mode in general and the CQI+data mode can be referred to as a feedback+data mode. The channel state information includes at least one selected from the group consisting of CQI, PMI, and RI.

Figure 9:
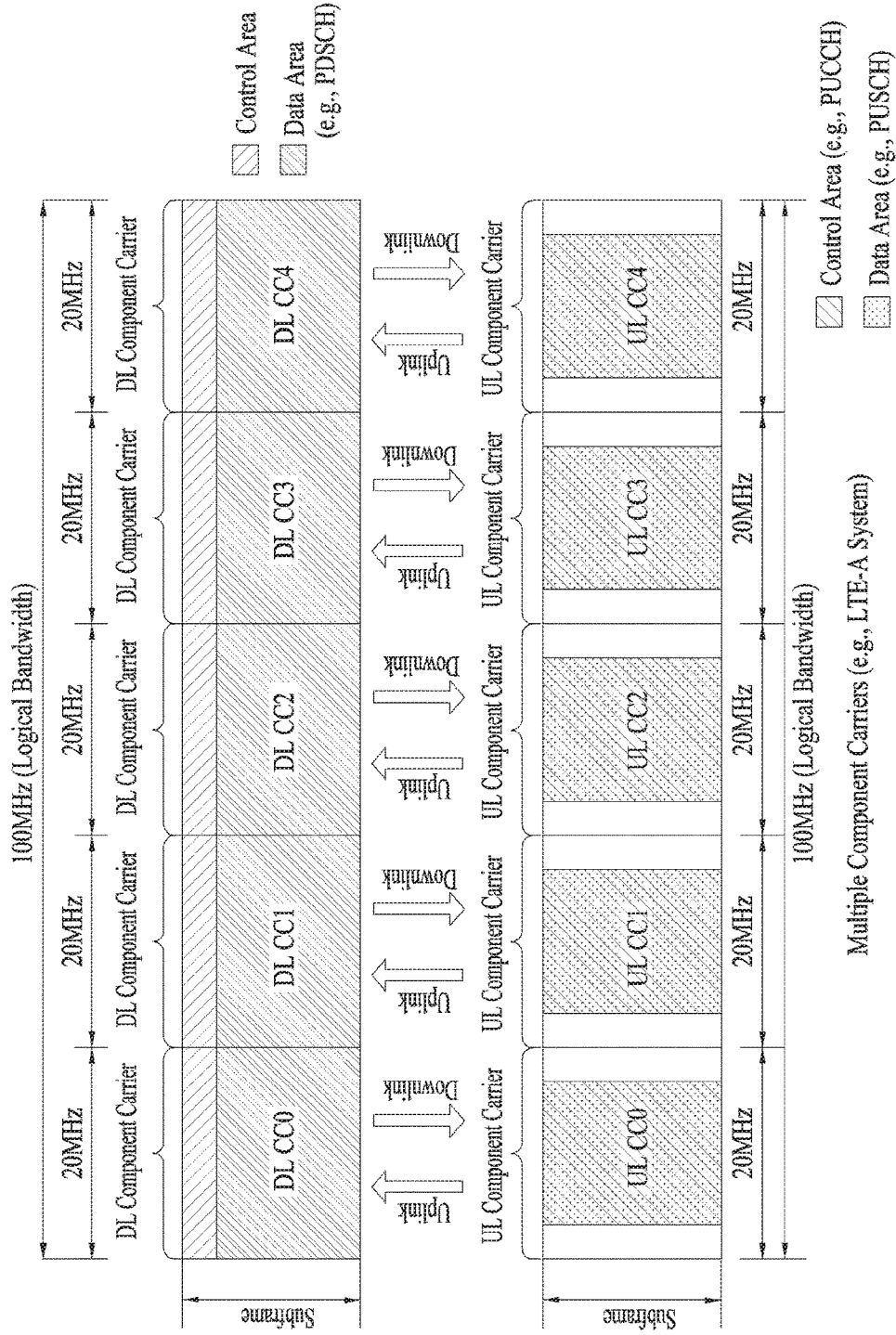
FIG. 9 illustrates a carrier aggregation (CA)-based wireless communication system.

FIG. 9 illustrates carrier aggregation (CA) communication system.

Referring to FIG. 9, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 10:
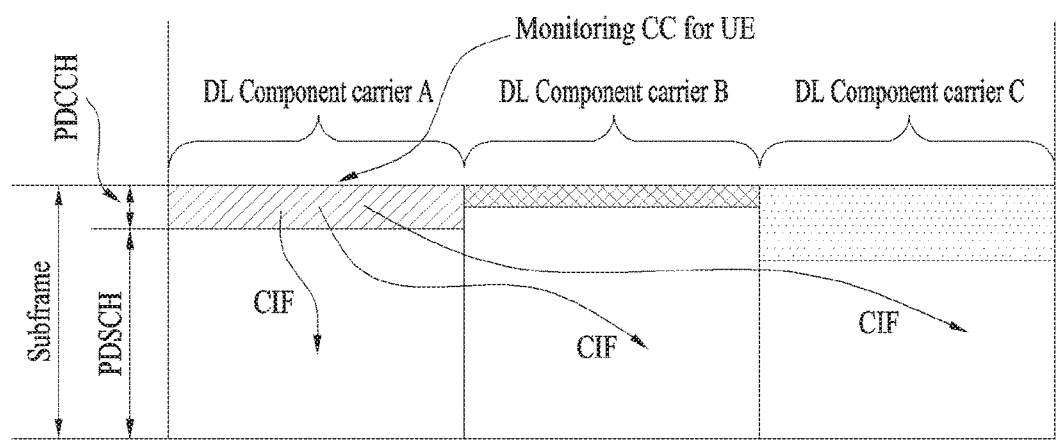
FIG. 10 illustrates a cross-carrier scheduling.

FIG. 10 illustrates scheduling when a plurality of carriers is aggregated. It is assumed that 3 DL CCs are aggregated and DL CC A is set to a PDCCH CC. DL CC A-C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Embodiment: Signal Transmission and Reception in LTE-U

As more communication devices require greater communication capacity, efficient utilization of limited frequency bands is becoming an increasingly important requirement in future wireless communication systems. Basically, a frequency spectrum is divided into a licensed band and an unlicensed band. The license band includes frequency bands reserved for a specific usage. For example, the license band includes a frequency band assigned by government for cellular communications (e.g., LTE frequency bands). The unlicensed band is a frequency band reserved for public use and is also referred to as a license-free band. The unlicensed band can be used by anyone without permission or declaration if it meets conditions of radio wave regulations. The unlicensed band is distributed or designated for the use of anyone at a close range, such as within a specific area or building, in an output range that does not interfere communication of other radio stations, and is widely used for wireless remote control, wireless power transmission, wireless LAN (WiFi), and the like.

A cellular communication system such as LTE system also considers a method of utilizing an unlicensed band (e.g., 2.4 GHz, 5 GHz band) used by a legacy WiFi system for traffic offloading. Basically, the unlicensed band is assumed to perform wireless transmission and reception through contention between communication nodes. Therefore, it is required for each communication node to perform channel sensing (CS) before a signal is transmitted and check that a different communication node does not transmit a signal. This is called CCA (Clear Channel Assessment). It may be necessary for a base station or a UE of an LTE system to perform the CCA to transmit a signal in an unlicensed. For clarity, an unlicensed band used in the LTE-A system is referred to as an LTE-U band. In addition, when a base station or a UE of an LTE-A system transmits a signal, other communication nodes such as WiFi and the like should perform the CCA to prevent interference. For example, according to the WiFi standard (801.11ac), a CCA threshold is regulated by −62 dBm for a non-WiFi signal and is regulated by −82 dBm for a WiFi signal. Therefore, when a signal other than WiFi is received with power equal to or greater than −62 dBm, an STA (Station)/AP (Access Point) does not transmit a signal in order not to cause interference. In WiFi system, if the STA/AP does not detect a signal equal to or greater than the CCA threshold for more than 4 us, the STA/AP performs the CCA and may be then able to perform signal transmission.

Figure 11:
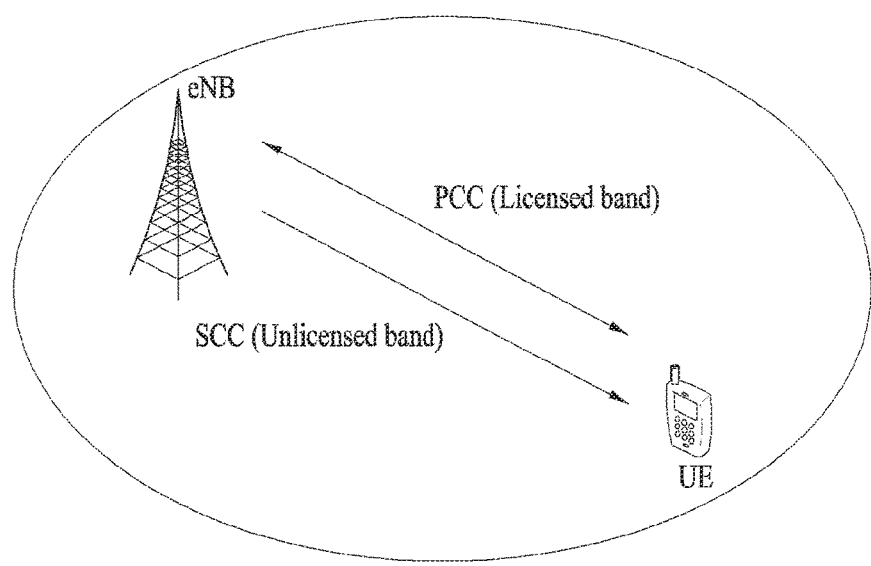
FIG. 11 illustrates carrier aggregation of a licensed band and an unlicensed band.

FIG. 11 illustrates carrier aggregation of a licensed band and an unlicensed band. Referring to FIG. 11, a base station can transmit a signal to a UE or a UE can transmit a signal to a base station under a carrier aggregation situation of a license band (hereinafter, LTE-A band) and an unlicensed band (hereinafter, LTE-U band). In this case, a center subcarrier or a frequency resource of the license band is interpreted as a PCC or a PCell, and a center subcarrier or a frequency resource of the unlicensed band can be interpreted as an SCC or a SCell.

Figure 12:
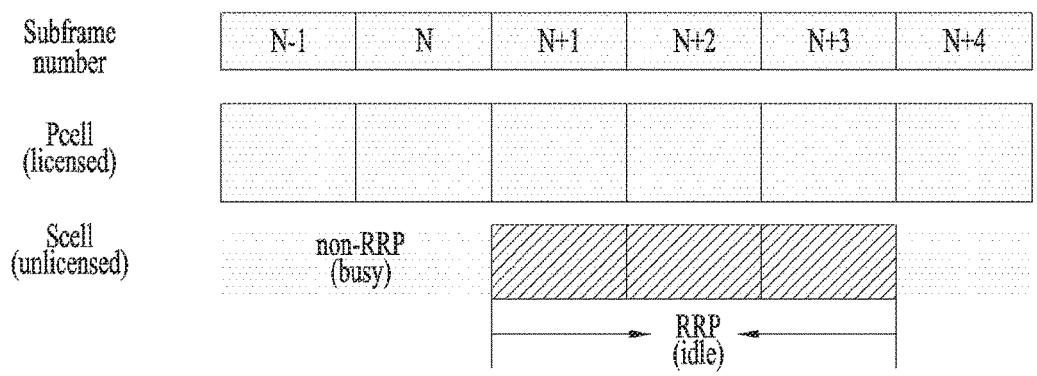
FIGS. 12 and 13 illustrate a method of reserving a resource on an unlicensed band.
Figure 13:
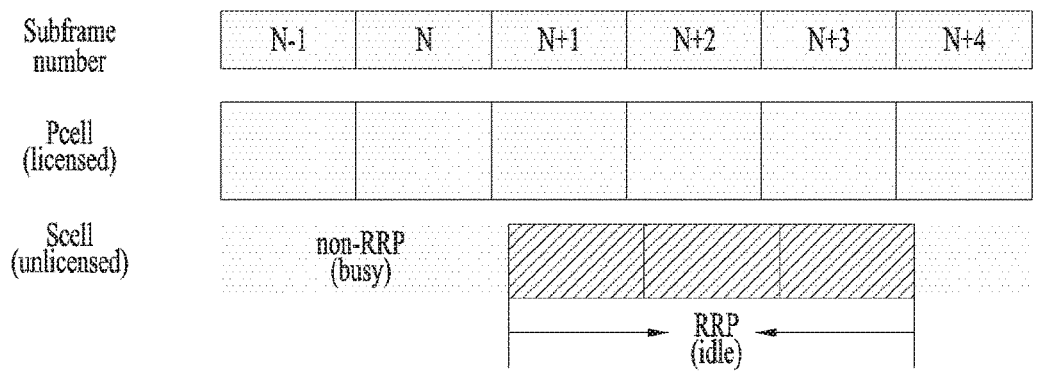

FIGS. 12 and 13 illustrate a method of reserving a resource on an unlicensed band. In order to perform communication between a base station and a UE on an LTE-U band, it is necessary to reserve/secure the band for a specific time period through competition with other communication systems (e.g., WiFi) not associated with LTE-A. For clarity, a time duration reserved/secured for cellular communication on the LTE-U band is called RRP (Reserved Resource Period). There exist several methods for securing the RRP. As an example, it may transmit a specific reservation signal during the RRP to make other communication system devices such as WiFi and the like recognize that a radio channel is busy. For example, a base station may consistently transmit an RS and a data signal during the RRP to make a signal equal to or greater than a specific power level to be seamlessly transmitted during the RRP. If the base station determines the RRP to be reserved on the LTE-U band in advance, the base station informs the UE of the RRP in advance to enable the UE to maintain a communication transmission/reception link during the RRP indicated by the base station. As a method of informing the UE of information on the RRP, the base station can forward the information on the RRP to the UE through a different CC (e.g., LTE-A band) which is connected in a form of carrier aggregation. RRP for uplink transmission can be indicated by the base station or can be checked in a subframe unit by checking a channel state through a carrier sensing before the UE transmits a signal.

As an example, it is able to configure RRP consisting of M (>=1) number of consecutive SFs. Unlikely, one RRP can also be configured by a set of discontinuous SFs (not depicted). In this case, a base station can inform a UE of a value of the M and M number of SF usages in advance through higher layer (e.g., RRC or MAC) signaling (using PCell) or a physical control/data channel. A start point of the RRP can be periodically configured via higher layer (e.g., RRC or MAC) signaling. And, when an SF #n is configured as the start point of the RRP, the start point of the RRP can be designated in the SF #n or an SF #(n−k) via physical layer signaling (e.g., (E)PDCCH). In this case, K is a positive integer (e.g., 4).

Figure 14:
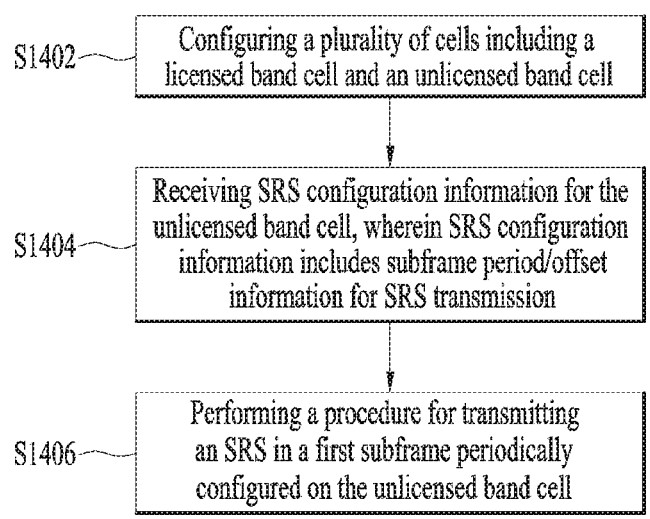
FIG. 14 illustrates a method of transmitting a signal according to one embodiment of the present invention.

The RRP can be configured in a manner that an SF boundary and an SF number/index are matched with a Pcell (hereinafter, aligned-RRP) (FIG. 13) or can be configured in a manner that the SF boundary or the SF number/index is not matched with the Pcell (hereinafter, floating-RRP) (FIG. 14). In the present invention, if an SF boundary is matched between cells, it may indicate that an interval between SF boundaries of two cells different from each other is equal to or less than a specific time (e.g., CP length, or X us (X≥0)). And, in the preset invention, the PCell may correspond to a reference cell for determining an SF (and/or symbol) boundary of an UCell in terms of time (and/or frequency) synchronization.

As a different operation example of an unlicensed band operating with a contention-based random access scheme, a base station can perform carrier sensing prior to data transmission and reception. The base station checks whether a current channel state of a SCell is busy or idle. If it is determined as idle, the base station transmits a scheduling grant (e.g., (E)PDCCH) to the UE through PCell (LTE-A band) or SCell (LTE-U band) and may be then able to attempt to transmit and receive data in the Scell.

In the following, a method of transmitting and configuring an SRS in a cell/carrier in which an available resource period is aperiodically or discontinuously secured/configured is proposed. The present invention can be applied to an LTE-U system that opportunistically operates on an unlicensed band based on carrier sensing. For clarity, in the following, assume a CA situation between a Pcell operating on a legacy licensed band and an Scell operating with LTE-U scheme. For clarity, an LTE-U based cell (e.g., Scell) is defined as an UCell and a resource period aperiodically secured or configured in the UCell is defined as RRP. A center frequency of the UCell is defined as (DL/UL) UCC. Meanwhile, a cell (e.g., Pcell, Scell) operating on a legacy licensed band is defined as an LCell and a center frequency of the LCell is defined as (DL/UL) LCC.

In the following, a method of transmitting a signal appropriate for CA situation in which RRP-based UCell is included (e.g., SRS transmission timing and relevant parameter configuration, aperiodic SRS transmission method, etc.) is proposed. In the following description, unless there is a special citation, a symbol denotes an OFDMA symbol or an SC-FDMA symbol. Specifically, a symbol denotes an OFDMA symbol in DL and denotes an SC-FDMA symbol in UL.

For clarity, assume a situation that one licensed band and one unlicensed band area aggregated for a UE and the UE is configured to perform radio communication based on the aggregated band. However, the schemes proposed by the present invention can also be applied to a situation that a plurality of licensed bands and a plurality of unlicensed bands are used via a carrier aggregation scheme. And, the schemes can also be applied to a case that a signal is transmitted and received between a base station and a UE using an unlicensed band only. Moreover, the schemes proposed by the present invention can be applied not only to 3GPP LTE system but also to a system of a different characteristic. In the following, such a term as a base station is used as a comprehensive term including an RRH (remote radio head), an eNB, a TP (transmission point), an RP (reception point), a relay, and the like.

(0) Determining SRS Transmission Timing in UCell

Since an available resource (e.g., subframe (SF)) is contiguously configured in a legacy LTE system, timing of transmitting a UE/cell-specific SRS can be deterministically (regularly) regulated based on such a parameter as a period/offset configured from a base station. Unlikely, since an available resource (e.g., SF), i.e., RRP, is aperiodically configured in an LTE-U based UCell, an RRP period (or UL SF) may not be configured (in the UCell) at corresponding timing although timing of transmitting an SRS is configured by the base station (in the UCell). In this case, if SRS transmission is omitted/abandoned (e.g., drop or skip) whenever the RRP period (or UL SF) is not configured at the timing of transmitting the SRS set to the UCell, it may lose most of SRS transmission opportunities and CSI measurement/acquisition on the UCell may not be sufficient in the base station. In this case, not only CSI on a UL channel but also CSI measurement/acquisition on a DL channel based on a channel reciprocity characteristic may not be sufficient. As a result, scheduling efficiency for the UCell can be degraded in the aspect of a transmission resource and power in use.

In consideration of the aforementioned situation, the present invention proposes a scheme that a specific (e.g., first) UL SF belonging to a closest RRP period including/appearing after the SRS transmission timing configured/indicated by the base station (hereinafter, configured SRS timing) is determined as an actual SRS transmission timing (hereinafter, actual SRS timing) in the UCell and SRS transmission corresponding to the configured SRS timing is performed via the timing. Specifically, if the configured SRS timing corresponds to UE-specific SRS transmission timing, it may perform the aforementioned operation. Hence, if the configured SRS timing corresponds to a cell-specific SRS transmission timing rather than the UE-specific SRS transmission timing, it may apply rate-matching to a specific (e.g., last) symbol used for transmitting an SRS when PUSCH is transmitted via the actual SRS timing (to protect SRS transmission of a different UE). In the present invention, a UL SF can include a (separate) symbol period configured for the usage of transmitting an SRS (or PRACH).

In addition, it may be able to set a limit/threshold to a time interval between the configured SRS timing and the actual SRS timing. For example, it may be able to determine a corresponding actual SRS timing only in a period ranging from the configured SRS timing to timing appearing after M (positive integer) number of SFs from the configured SRS timing. Hence, if an interval between the configured SRS timing and the actual SRS timing exceeds the limit/threshold, it may be able to drop SRS transmission corresponding to the configured SRS timing. In this case, since the SRS transmission is dropped at the actual SRS timing, it may be able to perform PUSCH transmission at the actual SRS timing corresponding to the configured SRS timing (UE-specific or cell specific SRS transmission timing) without applying rate-matching (or puncturing) to a symbol for transmitting an SRS.

As a different method, if an RRP is not configured/set to the configured SRS timing or if it is determined as a radio channel is busy at the timing via carrier sensing of a UE, it may be able to drop SRS transmission corresponding to the configured SRS timing.

When a UE performs RRP securement/UL transmission based on carrier sensing, it may be necessary for the UE to transmit a reservation signal before UCell SRS transmission starts. The reservation signal can be configured by a frequency resource which is allocated to transmit the SRS only (in consideration of FDM with a different UE).

Meanwhile, when a PRACH (preamble) is transmitted in an UCell, a principle/operation similar to the aforementioned proposal can also be applied. Specifically, a specific (e.g., first) UL SF belonging to a closest RRP period including/appearing after PRACH transmission timing configured/indicated by the base station (hereinafter, configured PRACH timing) is determined as an actual PRACH transmission timing (hereinafter, actual PRACH timing) in the UCell and PRACH transmission can be performed via the timing. In addition, it may be able to set a specific limit/threshold to a time interval between the configured PRACH timing and the actual PRACH timing. For example, it may be able to determine a corresponding actual PRACH timing only in a period ranging from the configured PRACH timing to timing appearing after M (positive integer) number of SFs from the configured PRACH timing. Hence, if an interval between the configured PRACH timing and the actual PRACH timing exceeds the limit/threshold, it may not define/permit actual PRACH timing (PRACH transmission via the actual PRACH timing) corresponding to the configured PRACH timing (e.g., drop PRACH transmission).

As a further different method, if an RRP is not configured/set to the configured PRACH timing or if it is determined as a radio channel is busy at the timing via carrier sensing of a UE, it may not attempt to transmit PRACH corresponding to the configured PRACH timing (e.g., drop PRACH transmission).

When a UE performs RRP securement/UL transmission based on carrier sensing, it may be necessary for the UE to transmit a reservation signal before UCell PRACH transmission starts. The reservation signal can be configured by a frequency resource which is allocated to transmit the PRACH only (in consideration of FDM with a different UE).

Meanwhile, when CSI on an UCell is periodically fed back, a principle/operation similar to the aforementioned proposal can also be applied. Specifically, a UE can measure a CSI type (e.g., RI, PMI, or CQI) corresponding to a configured CSI-R timing on a specific (e.g., first) DL SF (actual CSI-M timing, e.g., SF #n2) belonging to a closest RRP period including/appearing after a CSI measurement timing (configured CSI-M timing, e.g., SF #(n1−k1) where k1=4 for FDD) linked to a CSI report timing (configured CSI-R timing: e.g., SF #n1) configured by a base station. Subsequently, the UE can report a CSI measurement result to the base station via a CSI report timing (actual CSI-R timing: e.g., SF #(n2+k2) where k2=4 for FDD) linked to the actual CSI-M timing (e.g., SF #n2). In this case, it may be able to additionally set a limit/threshold to a time interval between the configured CSI-M (or CSI-R) timing and the actual CSI-M (or CSI-R) timing. For example, it may be able to determine a corresponding actual CSI-M (or CSI-R) timing only in a period ranging from the configured CSI-M (or CSI-R) timing to timing appearing after M (positive integer) number of SFs from the configured CSI-M (or CSI-R) timing. Hence, if an interval between the configured CSI-M (or CSI-R) timing and the actual CSI-M (or CSI-R) timing exceeds the limit/threshold, it may omit CSI report corresponding to the configured CSI-R timing (e.g., drop CSI transmission).

Meanwhile, when a specific DL signal (e.g., CSI-RS and/or CRS) is transmitted in an UCell, a principle/operation similar to the aforementioned proposal can also be applied. Specifically, in case of a CSI-RS, a specific (e.g., first) DL SF belonging to a closest RRP period including/appearing after CSI-RS transmission timing configured by the base station (hereinafter, configured CSI-RS timing) is determined as an actual CSI-RS transmission timing (hereinafter, actual CSI-RS timing) in the UCell and CSI-RS transmission/reception corresponding to the configured CSI-RS timing and a relevant operation (e.g., rate-matching on a CSI-RS) can be performed via the actual CSI-RS timing. In addition, it may be able to set a specific limit/threshold to a time interval between the configured CSI-RS timing and the actual CSI-RS timing. For example, it may be able to determine a corresponding actual CSI-RS timing only in a period ranging from the configured CSI-RS timing to timing appearing after M (positive integer) number of SFs from the configured CSI-RS timing. Hence, if an interval between the configured CSI-RS timing and the actual CSI-RS timing exceeds the specific limit/threshold, it may be able to omit CSI-RS transmission/reception corresponding to the configured CSI-RS timing. In this case, the UE may perform operation (e.g., PDSCH decoding) under an assumption that the CSI-RS transmission/reception corresponding to the configured CSI-RS timing is omitted. In case of a CRS, information (e.g., CRS transmission period/offset) related to a CRS transmission timing (hereinafter, a configured CRS timing) in an UCell can be configured by the base station. A specific (e.g., first) DL SF belonging to a closest RRP period including/appearing after the configured CRS timing is determined as an actual CRS transmission timing (hereinafter, actual CRS timing) in the UCell and CRS transmission/reception corresponding to the configured CRS timing can be performed via the actual CRS timing. In addition, it may be able to set a specific limit/threshold to a time interval between the configured CRS timing and the actual CRS timing. For example, it may be able to determine a corresponding actual CRS timing only in a period ranging from the configured CRS timing to timing appearing after M (positive integer) number of SFs from the configured CRS timing. Hence, if an interval between the configured CRS timing and the actual CRS timing exceeds the specific limit/threshold, it may be able to omit CRS transmission/reception corresponding to the configured CRS timing. In this case, the UE may perform operation (e.g., PDCCH/PDSCH decoding) under an assumption that the CRS transmission/reception corresponding to the configured CRS timing is omitted.

In addition, when a specific resource (e.g., CSI-IM or zero-power CSI-RS) is configured for the purpose of IM (interference measurement) in an UCell, a principle/operation similar to the aforementioned proposal can also be applied to the specific resource. Specifically, a specific (e.g., first) DL SF belonging to a closest RRP period including/appearing after IM resource configuration timing configured by the base station (hereinafter, configured IM timing) is determined as an actual IM resource configuration timing (hereinafter, actual IM timing) in the UCell and IM resource configuration/reception/measurement corresponding to the configured IM timing and a relevant operation (e.g., rate-matching on a corresponding IM resource) can be performed via the actual IM timing. In addition, it may be able to set a specific limit/threshold to a time interval between the configured IM timing and the actual IM timing. For example, it may be able to determine a corresponding actual IM timing only in a period ranging from the configured IM timing to timing appearing after M (positive integer) number of SFs from the configured IM timing. Hence, if an interval between the configured IM timing and the actual IM timing exceeds the specific limit/threshold, it may be able to omit IM resource configuration/reception/measurement corresponding to the configured IM timing. In this case, the UE may perform operation (e.g., PDSCH decoding) under an assumption that the IM resource configuration/reception/ measurement corresponding to the configured IM timing is omitted.

Preferably, the M value corresponding to the limit/threshold of the time interval between the configured timing and the actual timing can be configured by a value smaller than a time interval between adjacent configured timings. The M value can be independently defined according to a signal.

FIG. 14 illustrates a method of transmitting a signal according to one embodiment of the present invention. For clarity, the drawing is made centering on a UE. A corresponding operation can be performed in a base station.

Referring to FIG. 14, a UE can configure a plurality of cells including a licensed band cell and an unlicensed band cell [S1402]. And, the UE can receive SRS configuration information for the unlicensed band cell [S1404]. In this case, the SRS configuration information can include subframe period/offset information for transmitting an SRS and frequency band information. Specifically, the SRS configuration information can include a cell-specific SRS parameter and/or a UE-specific SRS parameter. Subsequently, the UE can perform a procedure for transmitting an SRS in a first subframe, which is periodically configured on the unlicensed band cell, based on the SRS configuration information [S1406].

If the first subframe belongs to UE-reserved time duration on the unlicensed band cell, an SRS is transmitted in the first subframe. If the first subframe does not belong to the UE-reserved time duration on the unlicensed band cell, SRS transmission can be skipped in the first subframe. In this case, the UE-reserved time duration can include a set of subframes reserved for uplink transmission on the unlicensed band based on the carrier sensing of the UE. And, if the first subframe does not belong to the UE-reserved time duration on the unlicensed band cell, the UE can perform a procedure for retransmitting an SRS, which is supposed to be transmitted in the first subframe, in a second subframe belonging to a closest UE-reserved time duration appearing after the first subframe. In this case, if an interval between the first subframe and the second subframe is less than a threshold, the SRS is transmitted in the second subframe. If the interval between the first subframe and the second subframe is equal to or greater than the threshold, transmission of the SRS can be dropped. And, if the SRS is transmitted in the first subframe, it may indicate that a channel reservation signal having a frequency band identical to the SRS is transmitted before the SRS is transmitted.

(1) Configuring SRS Transmission Parameter in UCell

Since RRP is secured/configured at opportunistic timing in UCell with a limitative duration, an operation of enabling a base station to more quickly measure/acquire CSI (on the UCell) is useful to more efficiently use the RRP period (in terms of scheduling).

Based on the aforementioned discussion, the present invention proposes a method of using a first symbol or first L (>1) number of symbols of the RRP period to transmit an SRS. Specifically, a random signal or a promised signal (hereinafter, a reservation signal) can be transmitted from a base station (or a UE) during a specific duration to stably secure RRP via channel reservation in the UCell before the symbol in which the SRS is transmitted. DL transmission can be performed by the base station or UL transmission can be performed by the UE according SF configuration set to the RRP after the symbol in which the SRS is transmitted. As a different method (or, as an additional method), if SFs configured in the RRP period are all set to UL, a start symbol of all or a specific (e.g., first) SF can be used for transmitting an SRS. In this case, when PDSCH (and/or CRS and/or (E)PDCCH)/PUSCH is transmitted via a DL/UL SF including the symbol in which the SRS is transmitted in the RRP period, it may apply rate-matching (or puncturing) to the symbol in which the SRS is transmitted.

As a different method (or, as a generalized method), a fore part or a latter part (one or more symbols) of a DL RRP period, which is used for scheduling DL data, can be used for transmitting an SRS to quickly acquire CSI using channel reciprocity. In case of UL, a fore part or a latter part (one or more symbols) of a UL RRP period, which is used for scheduling UL data, can also be used for transmitting an SRS to quickly measure CSI. When SRS transmission is performed via a symbol period configured to transmit an SRS, the SRS transmission can be indicated via signaling (e.g., L1/L2 signal (e.g., PDCCH)) indicating the RRP period/configuration information.

In addition, in order (for a base station) to efficiently measure/obtain CSI on opportunistically secured RRP in the UCell, it may be able to configure a UE to perform a plurality of SRS transmissions via a plurality of SFs (or symbols) during a single RRP period. And, Specifically, it may be able to configure a plurality of SRS transmissions (e.g., M number of SRS transmissions) to make SRS transmission from a UE to be hopped/cycled once on the entire system bandwidth of the UCell or the entire SRS transmission band set to the UCell during one or more RRP periods (e.g., N number of RRP periods). In this case, the M can be configured by a multiple of the N.

In addition, it may consider a case that carrier sensing (e.g., competitive carriers association (CCA)) is performed on PUSCH transmission and SRS transmission (via a different time and frequency resource), respectively, in a situation that PUSCH transmission and SRS transmission are simultaneously scheduled and configured/indicated to a single UL SF in (identical) UCell. In this case, in case of performing the PUSCH transmission, it may apply puncturing (rather than rate matching) to an SRS symbol (irrespective of whether or not an SRS is actually transmitted).

(2) Indicating Aperiodic SRS Transmission in UCell

In order for a base station to indicate aperiodic SRS transmission to a UE in a legacy system, it is always necessary for the base station to transmit a specific scheduling DCI (e.g., UL grant DCI) to the UE. Meanwhile, it is highly probable that RRP is to be irregularly provided in the UCell with a limitative period. Hence, if the aperiodic SRS transmission is indicated by the UL grant DCI whenever channel sounding (CSI measurement/acquisition on the UCell via the channel sounding) is performed in the RRP period having the aforementioned characteristic, it may be not preferable in terms of overhead.

Hence, the present invention proposes a method of (additionally) indicating aperiodic SRS transmission via an RRP period in the UCell through a specific DCI instead of the UL grant DCI. In this case, the specific DCI may have such a form as a DL grant DCI form (for scheduling UCell), a PDCCH form to which a separate UE-common RNTI-based scrambling is applied, or a form indicating whether to perform aperiodic SRS transmission according to a bit value in a state that each bit of a DCI is configured to indicate an individual UE to perform aperiodic SRS transmission.

Meanwhile, if aperiodic SRS transmission is indicated in an SF #n via specific DCI transmission, it may be able to transmit a corresponding SRS via an SF #(n+k) (e.g., k=4) or a closest UL SF (within UCell RRP period) including/ appearing after the SF #(n+k) (without a separate UE-specific SRS transmission timing configuration). If aperiodic SRS transmission is indicated via UL grant DCI, the aperiodic SRS transmission can be performed via a UL SF in which PUSCH corresponding to the DCI is transmitted or a specific (e.g., last) symbol belonging to an SF immediately before the UL SF. As a different method, in case of UCell, it may be able to configure an SRS to be always transmitted in a UL SF in which PUSCH is transmitted without any indication. For example, an SRS can be transmitted via a specific (e.g., last) symbol in a UL SF in which PUSCH is transmitted. And, if a UE performs RRP reservation/UL transmission based on carrier sensing, the UE can transmit a reservation signal before UCell SRS transmission starts.

When a PRACH is transmitted in the UCell, a method similar to the aforementioned method can be applied. Specifically, if PRACH transmission is indicated via a PDCCH order transmitted in an SF #n, a corresponding PRACH can be transmitted in an SF #(n+m) (e.g., m=6) or a closest UL SF (belonging to RRP period of the UCell) including/ appearing after the SF #(n+m) (without a separate cell-specific PRACH transmission timing configuration). And, if a UE performs RRP reservation/UL transmission based on carrier sensing, the UE can transmit a reservation signal before UCell PRACH transmission starts.

Meanwhile, similar to the aforementioned proposal, it may be able to apply an aperiodic DL signal (e.g., RS) transmission scheme to transmission of a specific DL signal of the UCell (e.g., CSI-RS and/or RS (e.g., CRS, discovery RS) transmitted to measure/track a CSI-RS) based on triggering of a base station. Specifically, in a state that a timing/period at which an RS is possibly transmitted (hereinafter, possible RS timing) is configured in advance via higher layer signaling (e.g., RRC signaling), a base station can trigger RS transmission via L1 signal (e.g., PDCCH signaling). After a triggering signal is detected, the UE (and/or the base station) can perform an operation of receiving (transmitting) the RS via a closest possible RS timing appearing after a triggering timing. The operation can be performed only when the closest possible timing appearing after the triggering timing belongs to an UCell RRP period. In particular, the UE can consider the possible RS timing belonging to the UCell RRP period as a valid measurement resource only. If the possible RS timing does not belong to the RRP period, the triggering signal can be ignored. For example, the UE may not perform the operation of receiving (transmitting) the RS at the possible RS timing. In this case, the UE can apply rate-matching to a resource (e.g., RE) configured to transmit an RS at all possible RS timings irrespective of whether or not RS transmission is triggered in consideration of a situation that the UE fails to detect the RS transmission triggering signal (from the base station). Or, it may apply puncturing to a corresponding RS transmission resource only when there is RS transmission (triggering). Otherwise, it may not apply the puncturing. The RS transmission triggering signal can be UE-commonly signaled. For example, the RS transmission triggering signal can be configured in a form of PDCCH transmitted via a CSS.

And, similar to the aforementioned scheme, it may apply a base station triggering-based aperiodic IM resource configuration scheme to a specific resource (i.e., CSI-IM or zero-power CSI-RS) which is configured for the usage of IM in the UCell. Specifically, in a state that a timing/period at which an IM resource is possibly configured (hereinafter, possible IM timing) is configured in advance via higher layer signaling (e.g., RRC signaling), a base station can trigger IM resource configuration via L1 signal (e.g., PDCCH signaling). After a triggering signal is detected, the UE (and/or the base station) can perform an operation of receiving/measuring (configuring) the IM resource via a closest possible RS timing appearing after a triggering timing. The operation can also be performed only when the closest possible timing appearing after the triggering timing belongs to an UCell RRP period. In particular, the UE can consider the possible IM timing belonging to the UCell RRP period as a valid measurement resource only. If the possible IM timing does not belong to the RRP period, the triggering signal can be ignored. For example, the UE may not perform the operation of receiving/measuring (configuring) the IM resource at the possible RS timing. In this case, the UE can apply rate-matching to a resource (e.g., RE) configured for the usage of IM at all possible IM timings irrespective of whether or not IM resource configuration is triggered in consideration of a situation that the UE fails to detect the IM resource configuration triggering signal (from the base station). Or, it may apply puncturing to a corresponding IM transmission resource only when there is IM transmission (triggering). Otherwise, it may not apply the puncturing. The IM configuration triggering signal can be UE-commonly signaled. For example, the IM configuration triggering signal can be configured in a form of PDCCH transmitted via a CSS.

(3) Controlling SRS Transmission in UCell

In a legacy CA situation, if UL transmit power exceeds UE maximum power limit (i.e., P_max) at a timing that SRSs transmitted via a plurality of cells are collided with each other, a method (i.e., equal power scaling) of reducing transmit power with the same rate is applied to all of a plurality of the SRSs. And, if SRS transmission and transmission of a different UL channel/signal (e.g., PUCCH/PUSCH) are collided with each other at the same timing (and/or if UL transmit power exceeds P_max at the timing), a scheme of dropping the SRS transmission is applied. Meanwhile, since securing an RRP period in the UCell depends on carrier sensing, and the like, it may be very irregular. Although the RRP is secured, if the SRS transmission in the UCell is collided with SRS transmission of a different cell or PUCCH/PUSCH transmission at the same timing, the UCell SRS can be frequently dropped or transmit power of the UCell SRS can be reduced due to low protection priority of the UCell SRS. As a result, since it is difficult to guarantee an opportunity of measuring/obtaining CSI on the UCell and accuracy, scheduling efficiency for the UCell can be deteriorated.

Based on this, if UL transmit power exceeds P_max at the timing that SRS transmission in the UCell and SRS transmission in a general cell (i.e., non-UCell) are collided with each other, the present invention proposes to preferentially reduce SRS transmit power in the general cell or omit/ abandon the SRS transmission in the general cell to protect the SRS transmission in the UCell. On the contrary, it may also consider a method of preferentially reducing the SRS transmit power in the UCell or a method of omitting/abandoning the SRS transmission in the UCell in the same situation to protect the SRS transmission in the general cell.

As a different method, if SRS transmission in the UCell and transmission of PRACH/PUCCH/PUSCH/SRS in a general cell are collided with each other at the same timing (and/or if UL transmit power exceeds P_max at the timing), it may be able to preferentially reduce transmit power in the general cell or drop transmission in the general cell to protect the UCell SRS transmission. Or, while the SRS transmit power of the UCell is preferentially reduced, a UE may control the entire UL channel/signal power. In this case, the PUCCH/PUSCH in the general cell can be limited to PUCCH including CSI transmission only or PUSCH not including UCI (e.g., HARQ-ACK, CSI) transmission.

It may be able to make adjusted transmit power of the UCell SRS not to be less than a threshold. In particular, a minimum value of the UCell SRS transmit power can be limited to the threshold. In this case, the threshold corresponds to a non-zero power value or a zero power value configured by a base station. If the threshold corresponds to the non-zero power value, although the UCell SRS transmit power is reduced, UCell SRS transmission may not be dropped. As a result, it may be able to stably maintain the RRP period by reserving contiguous channels in the UCell.

There is no limit in the minimum value of the UCell SRS transmit power. The UCell SRS transmission can be performed only when adjusted UCell SRS transmit power is equal to or greater than a threshold. If the adjusted UCell SRS transmit power is less than the threshold, the UCell SRS transmission can be dropped. In this case, the threshold corresponds to a non-zero power value or a zero power value configured by a base station.

Meanwhile, it may be able to apply a signal processing scheme similar to the aforementioned scheme in a state that UCell SRS is replaced with UCell PUSCH.

(4) Reservation Signal for UL Transmission in UCell

In UCell UL, it may be necessary for a UE to transmit a specific signal (i.e., reservation signal or rsv-sig) for the purpose of UCell radio channel reservation and/or subframe (boundary) synchronization, and the like prior to UL channel/signal (e.g., PUSCH/SRS) transmission timing configured/scheduled by a base station. The rsv-sig can be configured in such a form as a legacy CP, an SRS, or a DMRS. The base station can configure transmit power of the rsv-sig in advance with a specific level/value. For example, the rsv-sig transmit power can be configured using an open-loop power control parameter only (i.e., the rsv-sig transmit power does not vary according to a TPC command) or can be configured in a form similar to a form of target reception power for transmitting a legacy PRACH. And, the base station can configure information such as rsv-sig transmission timing/period and/or carrier sensing performance timing/period of the UE in consideration of a situation that a plurality of UEs perform UL transmission at the same time based on carrier sensing. In addition, the base station may indicate the UE, which is not accompanied with UL channel/signal (e.g., PUSCH/SRS) transmission, to transmit the rsv-sig only via a predetermined specific timing/period or an appropriate timing/period according to a carrier sensing result (e.g., idle) to reserve UCell radio channel only in a specific situation.

Meanwhile, UL transmit power may exceed P_max at a timing that the rsv-sig transmission in the UCell and transmission of a different UL channel/signal (not the rsv-sig) in a different cell are collided with each other. In this case, the present invention proposes to reduce transmit power or omit/abandon transmission based on protection priority described in the following. For example, it may be able to reduce transmit power or omit/abandon transmission from a signal having a lower priority first.

PRACH/PUCCH/PUSCH/SRS>rsv-sig,
PRACH/PUCCH/PUSCH>rsv-sig=SRS
PRACH/PUCCH/PUSCH>rsv-sig>SRS, or
PRACH/PUCCH/PUSCH with UCI>PUSCH without UCI=rsv-sig>SRS In this case, PUSCH with UCI corresponds to PUSCH including UCI transmission and PUSCH without UCI corresponds to PUSCH not including the UCI transmission.

As a different method, if rsv-sig transmission in the UCell and transmission of PRACH/PUCCH/PUSCH/SRS in a different cell are collided with each other at the same timing (and/or if UL transmit power exceeds P_max), it may be able to preferentially reduce PRACH/PUCCH/PUSCH/SRS transmit power of the different cell or drop PRACH/PUCCH/PUSCH/SRS transmission of the different cell to protect the rsv-sig transmission. Or, while the rsv-sig transmit power of the UCell is preferentially reduced, a UE may control the entire UL channel/signal power. In this case, the PUCCH/PUSCH of the different cell can be limited to PUCCH including CSI transmission only or PUSCH not including UCI (e.g., HARQ-ACK, CSI) transmission.

It may be able to make adjusted transmit power of the UCell rsv-sig not to be less than a threshold. In particular, a minimum value of the UCell rsv-sig transmit power can be limited to the threshold. In this case, the threshold corresponds to a non-zero power value or a zero power value configured by a base station. If the threshold corresponds to the non-zero power value, although the UCell rsv-sig transmit power is reduced, UCell rsv-sig transmission may not be dropped. As a result, it may be able to stably maintain the RRP period by reserving contiguous channels in the UCell.

There is no limit in the minimum value of the UCell rsv-sig transmit power. The UCell rsv-sig transmission can be performed only when adjusted UCell rsv-sig transmit power is equal to or greater than a threshold. If the adjusted UCell rsv-sig transmit power is less than the threshold, the UCell rsv-sig transmission can be dropped. In this case, the threshold corresponds to a non-zero power value or a zero power value configured by a base station.

As a further different method, the rsv-sig, which is transmitted to reserve an UCell radio channel before a UL channel/signal scheduled/configured in the UCell is transmitted, and the UL channel/signal may have the same protection priority. It may adjust power of the rsv-sig (or skip transmission) based on the protection priority.

As a further different method, in a state that protection priority (e.g., UCell>general cell or UCell<general cell) between a UCell and a general cell is configured only irrespective of a UL channel/signal type (including rsv-sig), it may consider a method of reducing UL channel/signal transmit power (or a method of omitting/abandoning transmission) according to priority between cells. And, in order to prevent HARQ-ACK performance from being degraded due to protection priority-based signal processing (e.g., transmit power control, transmission drop), it may be able to intentionally configure a subframe (period) not including HARQ-ACK transmission by shifting a partial HARQ-ACK transmission timing in the general cell. By doing so, it may be able to transmit the UCell UL signal/channel in the period without a collision with HARQ-ACK transmission.

Meanwhile, if the rsv-sig transmission is omitted/abandoned (e.g., dropped) (or, if rsv-sig transmit power is less than a specific threshold), it may be difficult to guarantee reservation of a radio channel in the UCell. Hence, a UE may also omit/abandon (e.g., drop) UL channel/signal transmission (e.g., PUSCH, SRS) configured/scheduled in an RRP period corresponding to the dropped rsv-sig. In other word, the UE can perform UL transmission in a corresponding RRP only when a carrier sensing result is determined as idle and the rsv-sig is transmitted without being dropped (and, the rsv-sig is transmitted by power equal to or greater than the threshold). On the contrary, if the carrier sensing result is determined as busy or the rsv-sig transmission is dropped (or, if transmit power is less than the specific threshold), corresponding UL transmission can also be dropped in the RRP.

Meanwhile, carrier sensing performed in the UCell, a collision between timing of transmitting rsv-sig of the UCell and timing of transmitting UL channel/signal of a different cell, and information on whether or not power control/dropping is performed can be anticipated before the carrier sensing/rsv-sig transmission timing. Hence, it is able to reduce unnecessary carrier sensing using operations described in the following based on the anticipation to reduce UE complexity. At the same time, it may be able to enhance UL transmission efficiency by reducing unnecessary transmission signal power control. For clarity, it may consider a situation that a UL channel/signal is scheduled/configured to be transmitted via an SF # (n+1) in the UCell and carrier sensing and rsv-sig transmission are performed via the SF #n. In this case, the carrier sensing can be performed to check and reserve an UCell radio channel. In this case, it may be able to anticipate a collision between UCell (UL channel/signal) transmission and transmission of a different cell (UL channel/signal) in a SF #(n+1) and information on whether or not power control/dropping is performed according to the collision prior to the SF #(n+1). In this case, the SF #n is generalized by a random timing (e.g., timing #1) and the SF #(n+1) can be generalized by a specific timing (e.g., timing #2) appearing after the timing #1. The timing #1 and the timing #2 can include a different timing in an identical SF.

Case #A: When dropping of a (virtual) rsv-sig transmission is anticipated due to a collision/power control in SF #n
  A UE omits carrier sensing in the SF #n and may be able to drop both rsv-sig transmission and UL channel/signal transmission corresponding to the rsv-sig transmission in SF #(n+1). Power control on UL channel/signal transmission in a different cell can be performed (again) by assuming a state that both the UCell rsv-sig transmission in the SF #n and the UCell UL channel/signal transmission in the SF #(n+1) do not exist.

Case #B: When no drop of rsv-sig transmission in SF #n and drop of UL channel/signal in SF # (n+1) are anticipated.
  1) A UE may perform an operation identical to the case A or 2) may perform carrier sensing in the SF #n, transmits UCell rsv-sig only according to the carrier sensing, and drop UCell UL channel/signal transmission in the SF #(n+1). In case of the 2), power control on UL channel/signal transmission in a different cell can be performed (again) by assuming a state that the UCell rsv-sig transmission exists in the SF #n, but the UCell UL channel/signal transmission does not exist in the SF #(n+1).

Case C: When no drop is anticipated for both rsv-sig transmission in SF #n and UL channel/signal transmission in SF # (n+1)
  A UE may perform carrier sensing and UCell rsv-sig transmission according to the carrier sensing in the SF #n. The UE can perform UCell UL channel/signal transmission in the SF #(n+1). Power control on UL channel/signal transmission in a different cell can be performed (again) by assuming a state that both the UCell rsv-sig transmission in the SF #n and the UCell UL channel/signal transmission in the SF #(n+1) exist.

The case B/C can also be applied to a scheme that UCell UL channel/signal transmission is immediately performed after carrier sensing without a separate rsv-sig transmission.

If UL channel/signal (e.g., PUSCH/SRS) transmission scheduled/configured to the UCell is dropped, the UE can report reasons of the drop in the UCell to the base station. For example, the reasons can include (i) a radio channel is not idle as a result of performing the carrier sensing on the UCell, (ii) drop of rsv-sig transmission and/or UCell channel/signal transmission corresponding to the rsv-sig transmission is anticipated due to a collision with UL channel/signal transmission of a different cell or power control (and/or carrier sensing is omitted).

Figure 15:
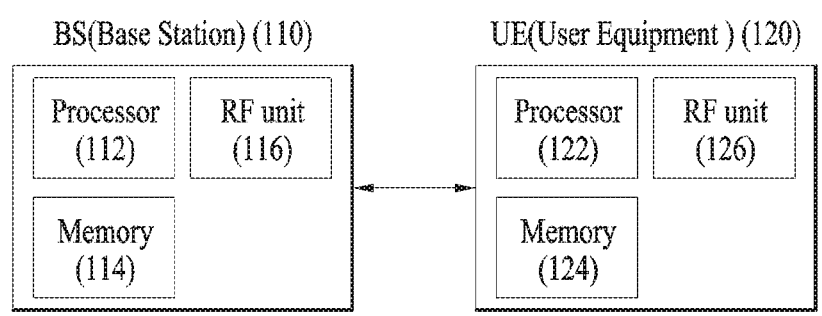
FIG. 15 illustrates a base station and a user equipment applicable to an embodiment of the present invention.

FIG. 15 illustrates a BS and a UE of a wireless communication system, which are applicable to embodiments of the present invention.

Referring to FIG. 15, the wireless communication system includes a BS 110 and a UE 120. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term WE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention mentioned in the foregoing description may be applicable to a user equipment, a base station, or other devices of wireless mobile communication systems.

What is claimed is:

1. A method of controlling signal transmission by a user equipment (UE) in a wireless communication system, the method comprising:
receiving sounding reference signal (SRS) configuration information for an unlicensed band cell, wherein the SRS configuration information comprises period and offset information for SRS transmission; and
performing a procedure for transmitting an SRS in a first time unit, which is periodically configured in the unlicensed band cell, based on the SRS configuration information,
wherein if the first time unit belongs to a UE-reserved time duration in the unlicensed band cell, the SRS is transmitted in the first time unit,
wherein if the first time unit does not belong to the UE-reserved time duration in the unlicensed band cell, a procedure for transmitting the SRS is further performed in a second time unit belonging to a closest UE-reserved time duration appearing after the first time unit, with skipping transmission of the SRS in the first time unit, and
wherein the procedure for transmitting the SRS in the second time unit includes:
if an interval between the first time unit and the second time unit is less than a threshold, transmitting the SRS in the second time unit; and
if the interval between the first time unit and the second time unit is equal to or greater than the threshold, dropping transmission of the SRS.

2. The method of claim 1, wherein the UE-reserved time duration comprises a set of time units reserved for uplink transmission in the unlicensed band cell based on carrier sensing of the UE.

3. The method of claim 1, wherein if the SRS is transmitted in the first time unit, a channel reservation signal containing a frequency band identical to the SRS is transmitted before the SRS is transmitted.

4. The method of claim 1, wherein the closest UE-reserved time duration appearing after the first time unit includes a plurality of time units, and the second time unit is a starting time unit of the plurality of time units.

5. A user equipment (UE) configured to control signal transmission in a wireless communication system, the UE comprising:
an RF (radio frequency) module; and
a processor, the processor configured to receive sounding reference signal (SRS) configuration information for an unlicensed band cell, wherein the SRS configuration information comprises period and offset information for SRS transmission, and to perform a procedure for transmitting an SRS in a first time unit, which is periodically configured in the unlicensed band cell, based on the SRS configuration information,
wherein if the first time unit belongs to a UE-reserved time duration in the unlicensed band cell, the SRS is transmitted in the first time unit,
wherein if the first time unit does not belong to the UE-reserved time duration in the unlicensed band cell, a procedure for transmitting the SRS is further performed in a second time unit belonging to a closest UE-reserved time duration appearing after the first time unit, with skipping transmission of the SRS in the first time unit, and
wherein in the procedure for transmitting the SRS in the second time unit:
if an interval between the first time unit and the second time unit is less than a threshold, the SRS is transmitted in the second time unit; and
if the interval between the first time unit and the second time unit is equal to or greater than the threshold, transmission of the SRS is dropped.

6. The user equipment of claim 5, wherein the UE-reserved time duration comprises a set of time units reserved for uplink transmission in the unlicensed band cell based on carrier sensing of the UE.

7. The user equipment of claim 5, wherein if the SRS is transmitted in the first time unit, a channel reservation signal containing a frequency band identical to the SRS is transmitted before the SRS is transmitted.

8. The user equipment of claim 5, wherein the closest UE-reserved time duration appearing after the first time unit includes a plurality of time units, and the second time unit is a starting time unit of the plurality of time units.

* * * * *